US012616634B2

(12) United States Patent
Liu et al.

(10) Patent No.: US 12,616,634 B2
(45) Date of Patent: May 5, 2026

(54) SEXUAL STIMULATION DEVICE

(71) Applicant: HYTTO PTE. LTD., Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/951,234

(22) Filed: Nov. 18, 2024

(65) Prior Publication Data

US 2025/0367064 A1 Dec. 4, 2025

(30) Foreign Application Priority Data

Jun. 3, 2024 (CN) ......................... 202421242692.6

(51) Int. Cl.
*A61H 19/00* (2006.01)

(52) U.S. Cl.
CPC ............. *A61H 19/44* (2013.01); *A61H 19/34* (2013.01); *A61H 2201/0153* (2013.01); *A61H 2201/1215* (2013.01); *A61H 2201/1436* (2013.01); *A61H 2201/5097* (2013.01)

(58) Field of Classification Search
CPC ............ A61H 19/44; A61H 2201/1215; A61H 2201/1664; A61H 2201/0153; A61H 19/32; A61H 19/34; A61H 19/50; A61H 2015/0042; A61H 19/00; A61H 19/30; A61H 19/40; A61H 2201/149; A61H 2201/123; A61H 2201/1669; A61H 23/0254; A61H 2205/087
See application file for complete search history.

(56) References Cited

U.S. PATENT DOCUMENTS 8,439,855 B2 * 5/2013 Knyrim .............. A61H 23/0263 600/38
2023/0024137 A1 * 1/2023 Larkin ................... A61H 19/44

* cited by examiner

*Primary Examiner* — Christine H Matthews
(74) *Attorney, Agent, or Firm* — Holtz, Holtz & Volek PC

(57) ABSTRACT

Embodiments of the present disclosure disclose a sexual stimulation device. The sexual stimulation device includes a body, a drive member disposed within the body, a sexual stimulator having a spiral structure rotatably coupled to the drive member, and a covering member adapted to wrap the spiral structure. The spiral structure wrapped by the covering member is adapted to be inserted into erogenous zones of a user's body. The rotational movement of the spiral structure relative to the covering member forms an undulation on at least a portion of the covering member without ripping the covering member, thereby providing undulating stimulation to the erogenous zone of the human body.

12 Claims, 13 Drawing Sheets

SEXUAL STIMULATION DEVICE

CROSS-REFERENCE TO RELATED APPLICATION

This application claims priority to Chinese Patent Application No. 202421242692.6, filed on Jun. 3, 2024 before the China National Intellectual Property Administration, the disclosure of which is incorporated herein by reference in entirety.

TECHNICAL FIELD

The present disclosure relates to sexual aid devices and, more particularly relates, to a sexual stimulation device for engaging and sexually stimulating the user's body, particularly the female genitals.

BACKGROUND

Massage stimulation devices mimic various human massage techniques to target specific areas of the user's body. These devices are typically used in electronic toys, medical equipment, massage tools, and other applications. Current massage devices use reciprocal telescoping, rotating, or pressing movements to provide massage or sexual stimulation to erogenous zones of a user's body. One such massage device 100, as shown in FIG. 1, mainly includes a handle, a drive member disposed within the handle, and a reciprocating motion structure. The reciprocating motion structure has a spindle 102, a guide shaft 104, one or more action beads 106, and a suspension support structure. A plurality of inclined and closed-loop construction of track ring grooves 108 are spaced apart along a circumferential wall surface of the spindle 102 along an axial direction. The guide shaft 104 is positioned on one side of the spindle 102, in a state parallel to the spindle 102. The one or more action beads 106 are mounted to the guide shaft 104 and adapted to be engaged with track ring grooves 108 through sliding or rolling contact. As the spindle rotates using the drive member, the one or more action beads 106 reciprocate along the axial direction of the guide shaft 104. The suspension support structure, which is slidingly positioned, facilitates this movement. The suspension support structure is positioned slidably between the one or more action beads 106 and the guide shaft 104. It applies an elastic force to the guide shaft 104, thereby keeping the one or more action beads 106 suspended against the circumferential wall of the guide shaft 104. Additionally, the spindle 102 of the reciprocating motion structure is connected to the drive member's driving end. The massage device further includes a case and a silicone sleeve. The case is attached to the handle houses the reciprocating motion structure. It features an opening through which the one or more action beads 106 are exposed. A silicone sleeve is fitted within the case and comes into contact with the one or more action beads 106. Unlike previous designs where the entire movement experienced sliding friction with the silicone sleeve, the structure disclosed in FIG. 1 reduces the friction area between the one or more action beads 106 and the silicone sleeve. This reduction in friction lowers heat generation, thereby extending the service life of the silicone sleeve.

However, this design requires additional space for the guide shaft 104, faces issues in installing the one or more action beads 106, and complicates the assembly process. Furthermore, as the one or more action beads 106 move only vertically along the spindle due to the track ring grooves, the massage effect is limited, leading to a suboptimal user experience.

Therefore, there exists a need for a massage stimulation device with an improved mechanism of movement to enhance sexual arousal on the user's body.

SUMMARY

Various embodiments of the present disclosure provide a sexual stimulation device for providing sexual stimulation and enhancing sexual arousal on the user's body.

In an embodiment, a sexual stimulation device is disclosed. The sexual stimulation device includes a body, a drive member disposed within the body, a sexual stimulator having a spiral structure adapted to be operably coupled to the drive member to allow a rotational movement thereof, and a covering member adapted to wrap the spiral structure. The spiral structure wrapped by the covering member is adapted to be inserted into erogenous zones of a user's body. The rotational movement of the spiral structure relative to the covering member forms an undulation on at least a portion of the covering member, without ripping the covering member, thereby providing undulating stimulation to the erogenous zone of the human body.

In another embodiment, a sexual stimulation device is disclosed. The sexual stimulation device includes a body, a drive member disposed within the body, a sexual stimulator having a spiral structure adapted to be operably coupled to the drive member to allow a rotational movement thereof, and a covering member. The spiral structure includes one or more spiral threads and a friction-lessening member. The friction-lessening member is disposed on the one or more spiral threads. The covering member is adapted to wrap the spiral structure. The spiral structure wrapped by the covering member is adapted to be inserted into erogenous zones of a user's body. The rotational movement of the spiral structure relative to the covering member forms an undulation on at least a portion of the covering member.

BRIEF DESCRIPTION OF THE FIGURES

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale.

Figure 1:
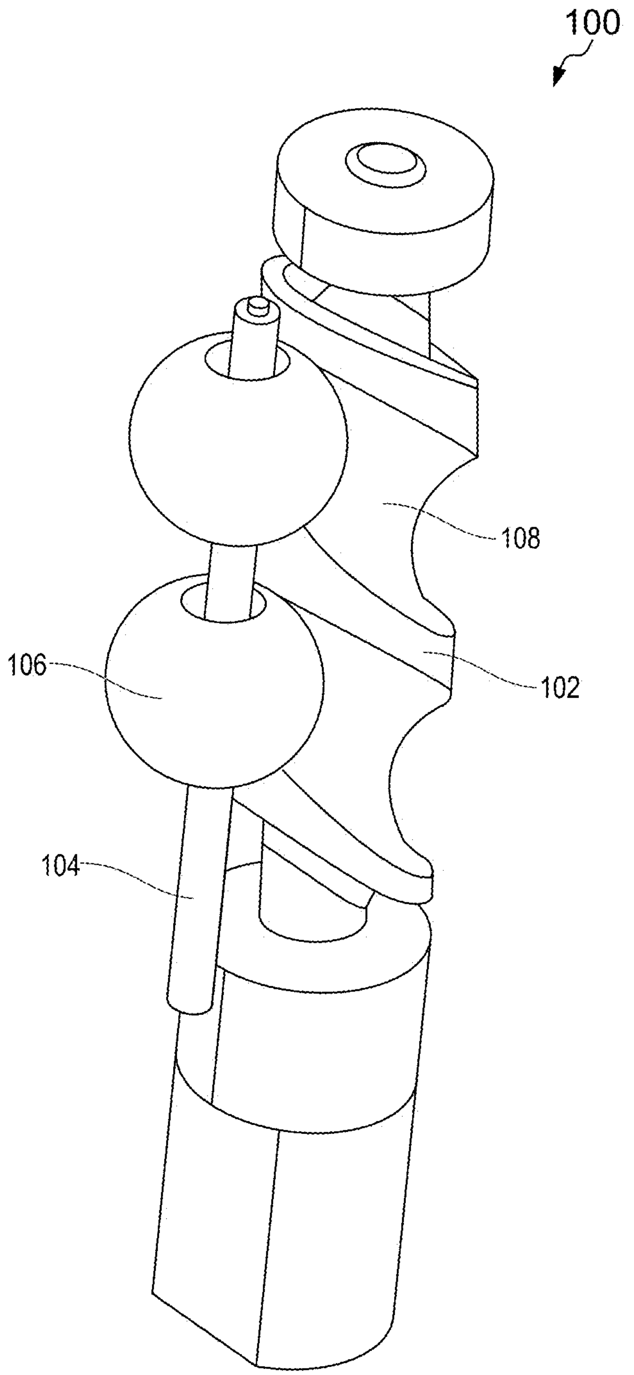
PRIOR ART FIG. 1
FIG. 1 illustrates a schematic representation of a structure of a massage device, in accordance with a prior art.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various examples of the present disclosure provide sexual stimulation devices. The sexual stimulation device includes a body, a sexual stimulator having a spiral structure and a head structure, a covering member wrapping the spiral structure and the head structure, and a clitoral vibrator. The body acts as a housing for one or more components, such as a drive member, a power transmitting member, etc. Additionally, during operation, the body functions as a handle for the device. The spiral structure is rotatably coupled to the drive member. The rotational movement of the spiral structure relative to the covering member forms an undulation on at least a portion thereof, thereby providing undulating stimulation to the erogenous zones, such as the vagina of the female user. The spiral structure includes a cylindrical shaft, a spiral thread formed on an exterior surface of the cylindrical shaft, and a friction-lessening member (e.g., a rolling member) disposed on the spiral thread. The friction-lessening member, disposed on the third helicoid of the spiral thread forms a higher pair with the covering member, thereby minimizing the friction during the movement of the spiral structure relative to the covering member so that the spiral structure can not rip the covering member. Other than the spiral structure, the head structure of the sexual stimulator is rotatably coupled to the spiral structure through a crankshaft. The head structure rotates with the rotation of the spiral structure to provide vibrational stimulation to the erogenous zones of the user's body.

In one embodiment, the friction-lessening member is an assembly of a mounting strip disposed on the spiral thread, a plurality of rolling elements, and a plurality of retainers mounted on the mounting strip to retain the plurality of rolling elements. In one configuration of this embodiment, the plurality of rolling element rolls in the plurality of retainer about its axis, relative to the covering member. In another configuration of this embodiment, the plurality of rolling elements can be fixedly positioned in the plurality of retainer. In yet another configuration of this embodiment, the need for the mounting strip and the plurality of retainers 508 can be eliminated, and the plurality of rolling elements may be directly fixedly attached to the third helicoid. Further, in another embodiment, the friction-lessening member is configured as a curved surface. Furthermore, in yet another embodiment, instead of a single continuous spiral thread, one or more spiral threads formed on the exterior surface of the cylindrical shaft from its first end portion to the second end portion. Each spiral thread extends partially in the circumferential direction of the cylindrical shaft. In each of these embodiments, the friction-lessening member makes a higher pair with at least a portion of the covering member, and due to flexibility, another portion of the covering member contracts in a region between a first helicoid and the adjacent second helicoid of the spiral thread. As a consequence, the rotational movement of the sexual stimulator relative to the covering member creates an undulation on at least a portion thereof. The undulation is a ripple-like oscillation in spiral propulsion, when squeezed by muscle via the spiral structure of the sexual stimulator, providing enhanced massage or sexual pleasure to the user.

Various example embodiments of the present disclosure are described hereinafter with reference to FIGS. 2A-2B to FIGS. 8A-8B.

Figure 2A:
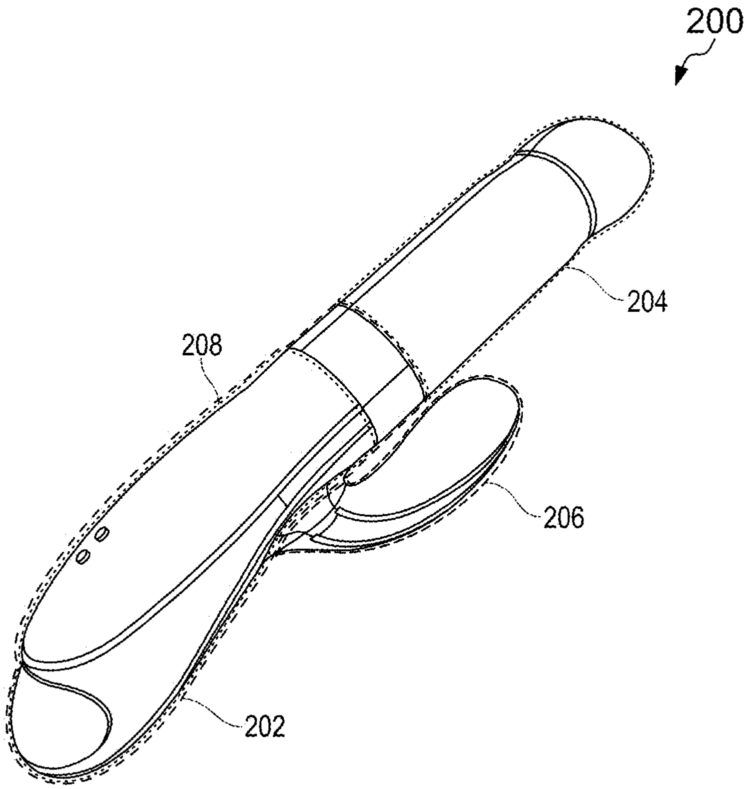
FIGS. 2A and 2B illustrate a perspective view of a sexual stimulation device, in accordance with various embodiments of the present disclosure.
Figure 2B:
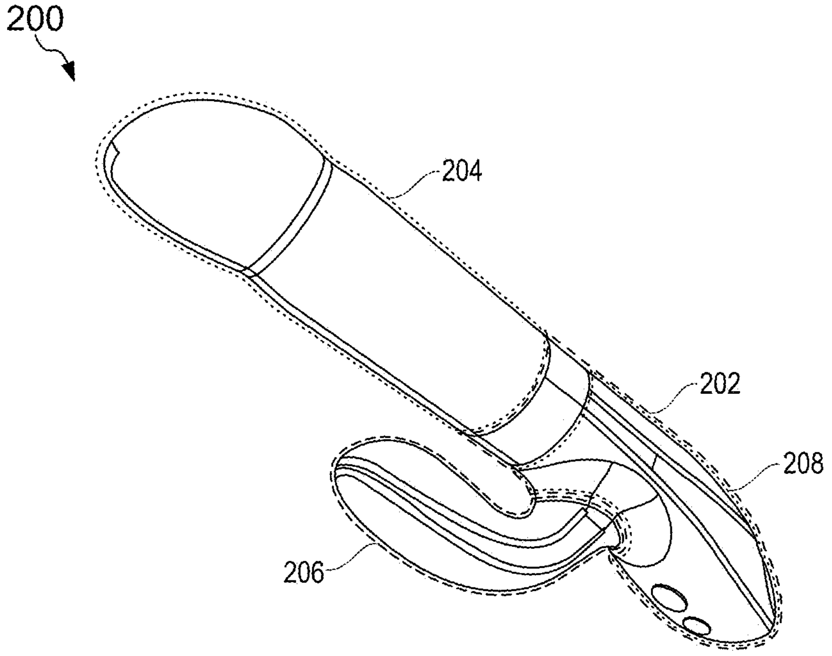

FIGS. 2A and 2B illustrate a perspective view of a sexual stimulation device 200 (also referred to as "device 200"), in accordance with various embodiments of the present disclosure. The sexual stimulation device 200 is designed to provide massage and arousal to erogenous zones on a user's body. The device 200, in particular, offers a variety of features, such as but not limited to altered vibration patterns, adjustable intensities, peristaltic and oscillating massage modes, and ripple-like oscillation. These features can be customized according to the user preferences.

The sexual stimulation device 200 mainly includes a body 202, a sexual stimulator having at least a spiral structure and a head structure (not visible in FIGS. 2A and 2B), a covering member 204 wrapped the spiral structure and the head structure, and a clitoral vibrator 206. In the illustrated configuration, the sexual stimulator, wrapped by the covering member 204, is aligned longitudinally along the body 202. In another configuration, the sexual stimulator, wrapped by the covering member 204, can be aligned transversely along the body 202. The clitoral vibrator 206 extends first obliquely from the body 202 and then substantially parallel to the sexual stimulator. To enhance user customization, the clitoral vibrator 206 can be adjustably mounted to the body 202 through a pivot joint, a swivel joint, and the like.

The body 202 is designed to serve one or more purposes. For instance, the body 202 acts as a housing for one or more components disposed therein. Moreover, during operation, the body 202 functions as a handle for the device 200. In an embodiment, a handle portion 208 of the body 202 may feature friction-inducing patterns, such as grooves, textures, cross patterns, or any combination thereof. These patterns create a frictional effect that enhances the grip on the user's palm while handling the device 200. This geometrical design of the handle portion 208 significantly reduces the risk of the device 200 slipping from the user's palm.

In a specific embodiment, the sexual stimulator, wrapped by the covering member 204, is designed to stimulate the erogenous zones (e.g., vagina) of the user's body. The rotational movement of the sexual stimulator relative to the covering member 204 creates an undulation on at least a portion thereof. The undulation is a ripple-like oscillation in spiral propulsion, when squeezed by muscle via the spiral structure of the sexual stimulator, providing enhanced massage or sexual pleasure to the user. The covering member 204 used for this purpose is made of resilient and flexible material, such as but not limited to silicone, borosilicate glass, Lucite® (synthetic thermoplastic resin such as polymethyl methacrylate), and the like. These materials are soft and lightweight, ensuring they do not cause harm or infection when in contact with internal or external parts of the user's body. The identical material can be utilized for the clitoral vibrator 206 which is designed to provide vibrational stimulation to the erogenous zones of the user's body, including the clitoris of the female user.

In the depicted example, the body 202, the sexual stimulator, and the clitoral vibrator 206 integrally form a uniform structure of the device 200. This unitary structure is designed as a rabbit vibrator. However, the present disclosure is not limited to the design of the rabbit vibrator, other shapes of the device 200 are also possible. In other examples, the device 200 may not include the clitoral vibrator 206, without limiting the scope of the disclosure. In this case, the body 202 and the sexual stimulator integrally form a unitary structure. Such a unitary structure can be constructed to form the shape of a sexual stimulator, such as a sex toy, an adult toy, a dildo, etc.

Figure 3A:
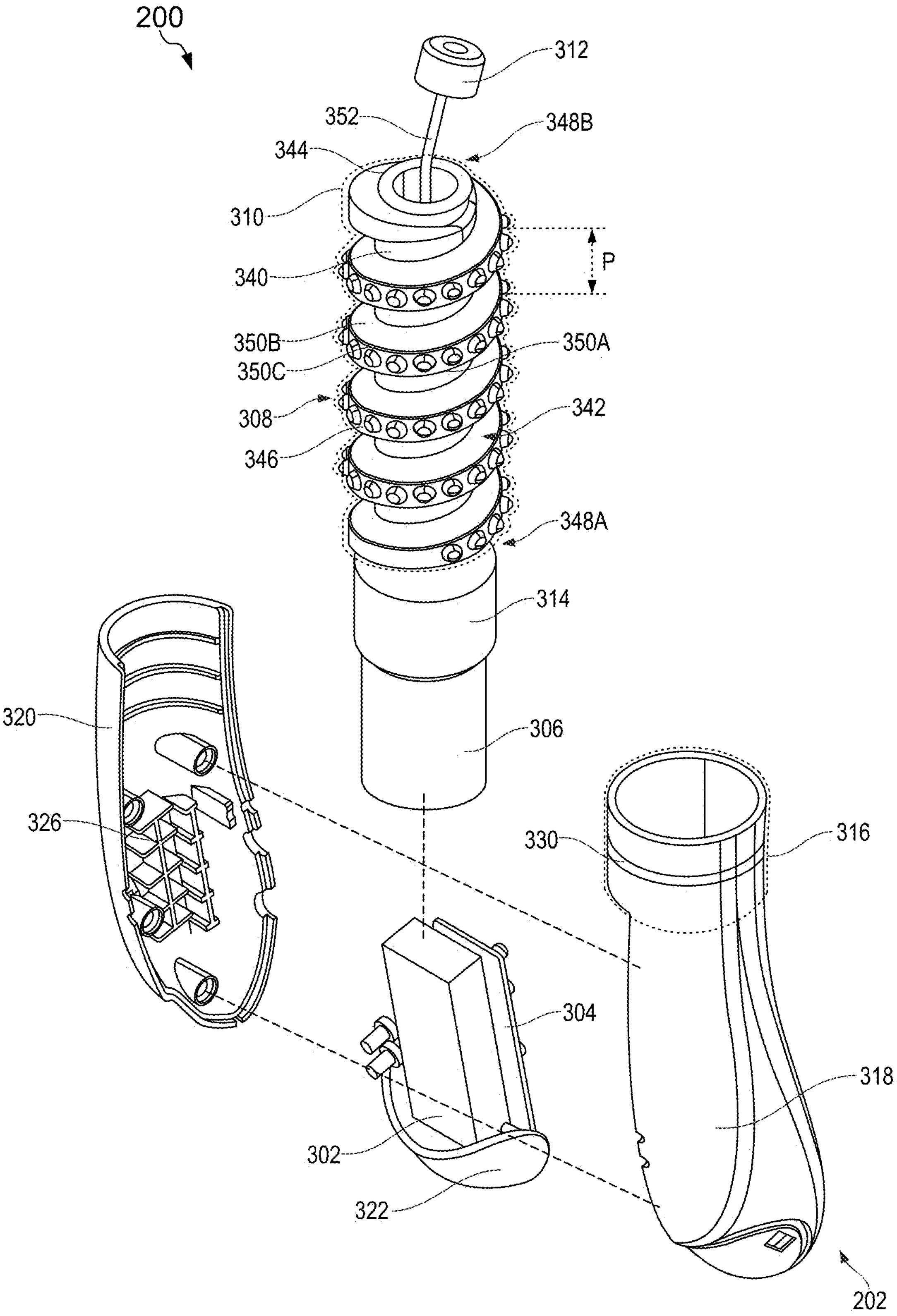
FIGS. 3A and 3B illustrate an exploded view of the sexual stimulation device of FIGS. 2A and 2B, in accordance with one embodiment of the present disclosure.
Figure 3B:
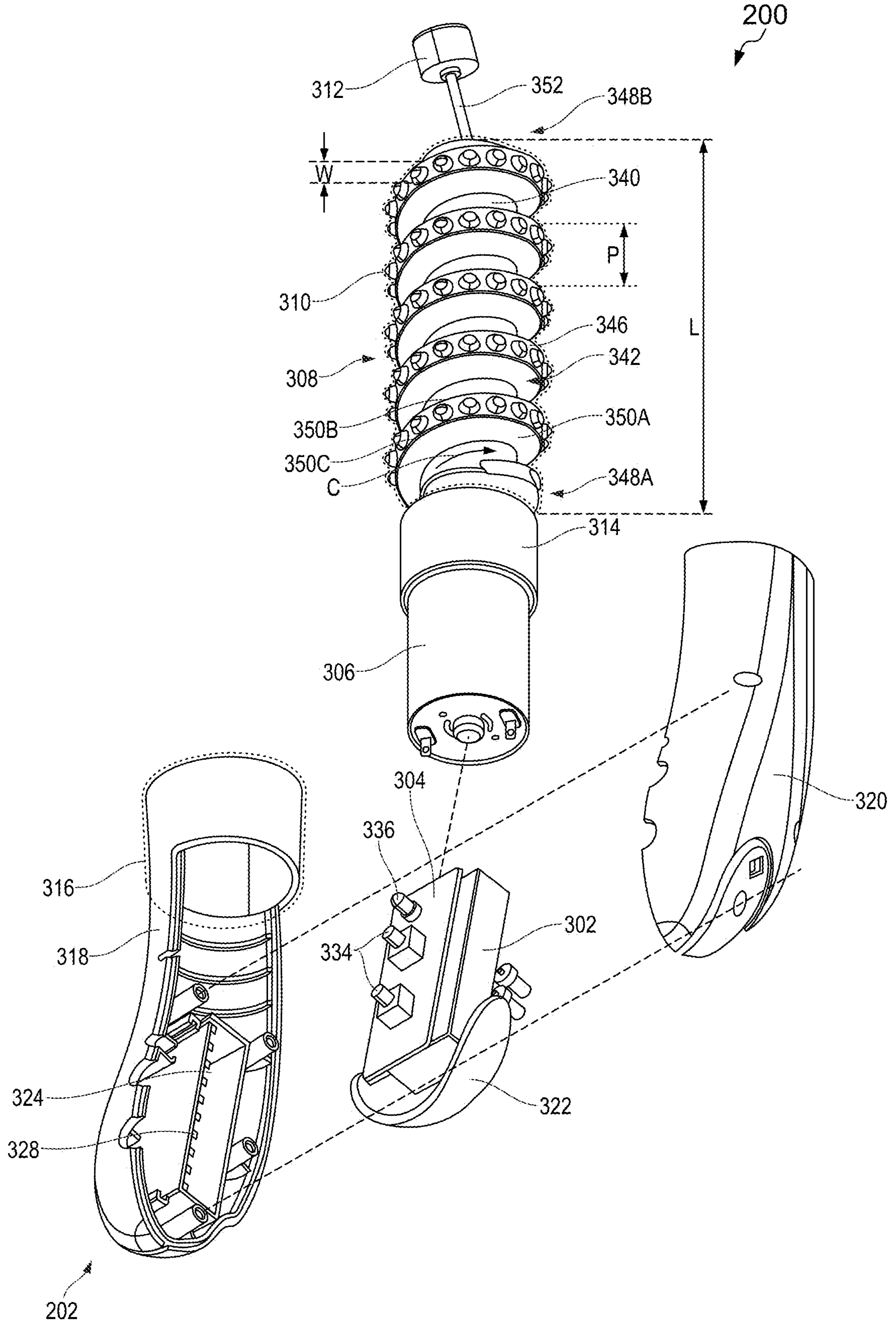
Figure 3C:
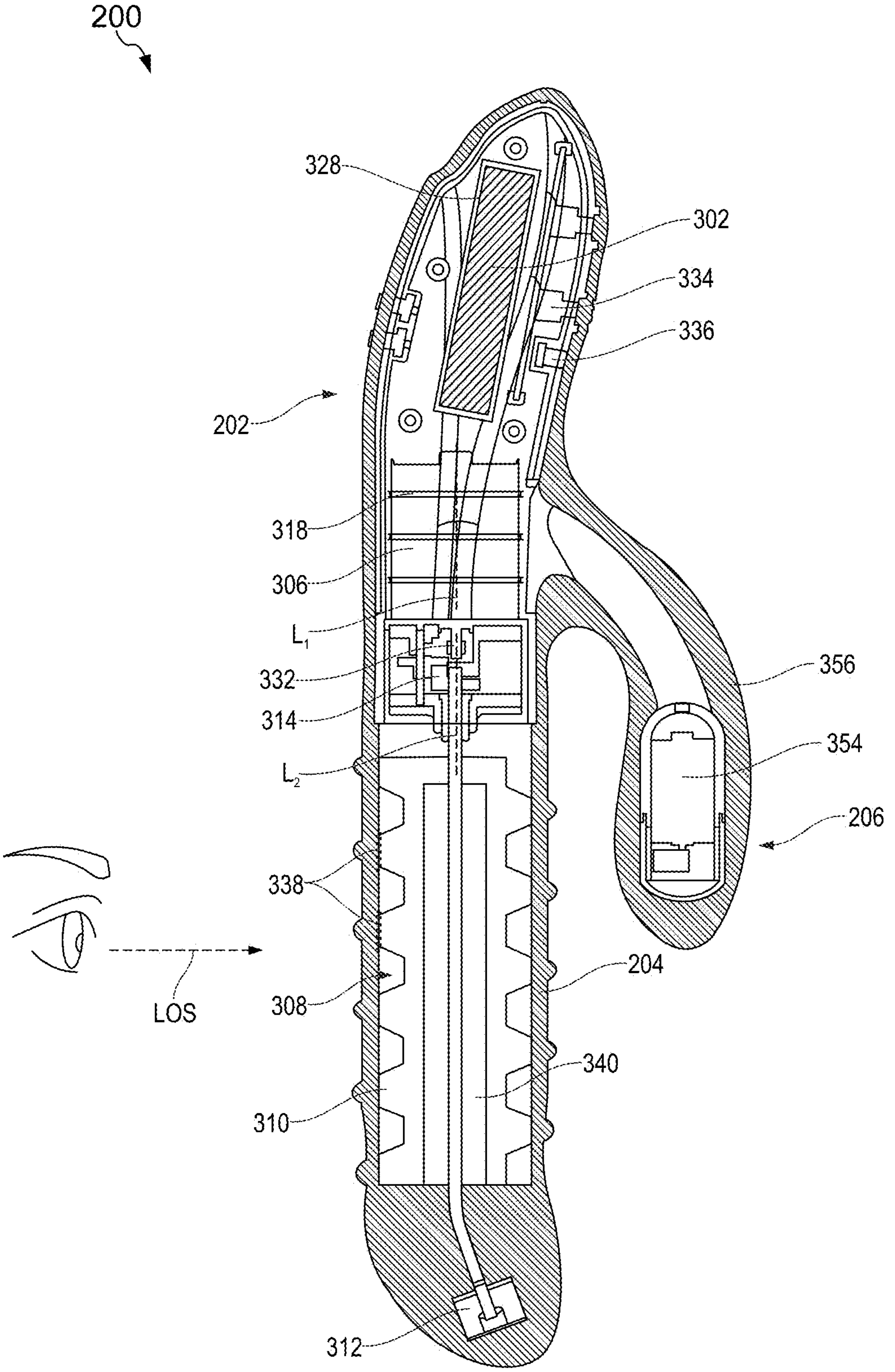
FIG. 3C illustrates a sectional view of the sexual stimulation device of FIGS. 2A and 2B, in accordance with one embodiment of the present disclosure.
Figure 3D:
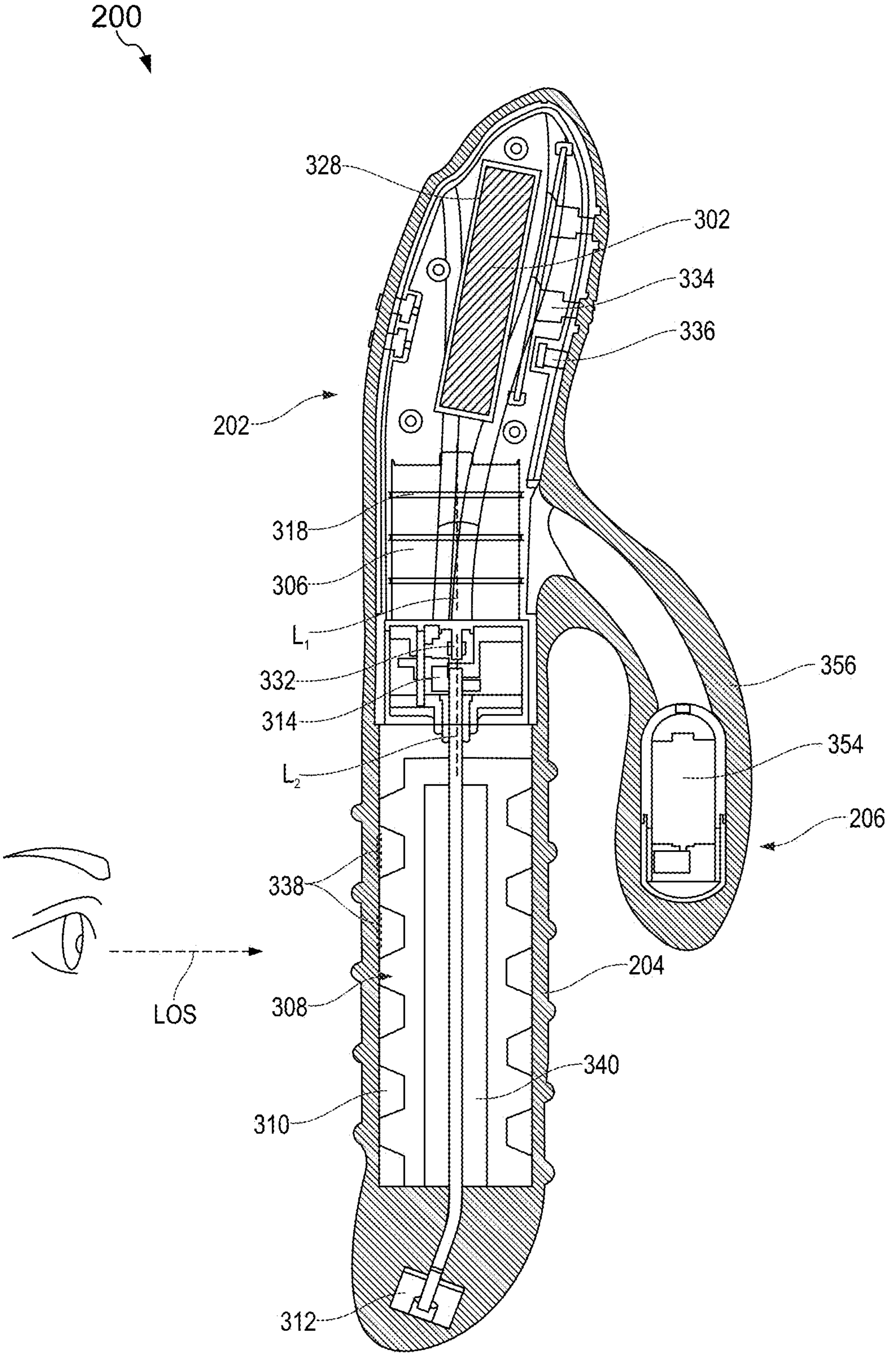
FIG. 3D illustrates a sectional view of the sexual stimulation device depicted in FIG. 3C, with a spiral structure of the sexual stimulation device rotated by 180°.

FIGS. 3A and 3B illustrate an exploded view of the sexual stimulation device 200 of FIGS. 2A and 2B, in accordance with one embodiment of the present disclosure. FIG. 3C illustrates a sectional view of the sexual stimulation device 200 of FIGS. 2A and 2B, in accordance with one embodiment of the present disclosure. Additionally, FIG. 3D illustrates a sectional view of the sexual stimulation device 200 depicted in FIG. 3C, with the spiral structure 310 rotated by 180°. The sexual stimulation device 200 includes, inter alia, a power source 302, a controller 304, a drive member 306 electrically connected to the power source 302 through the controller 304, the sexual stimulator 308 including the spiral structure 310 and the head structure 312, and a power transmitting unit 314 that operably couples the spiral structure 310 to the drive member 306. The power source 302, the controller 304, and the drive member 306 are housed within the handle portion 208 of the body 202, whereas the power transmitting unit 314 is housed within a housing portion 316 of the body 202.

In the illustrated configuration, the handle portion 208 of the body 202 includes at least a fixed part 318, a first detachable part 320, and a second detachable part 322. The first detachable part 320 and the second detachable part 322 are removably secured to the fixed part 318 using an appropriate fastening mechanism. In a non-limiting example, a snap-fit arrangement is employed to secure the first detachable part 320 and the second detachable part 322 to the fixed part 318. This configuration of the handle portion 208 allows easy maintenance and replacement of the power source 302, the controller 304, and the drive member 306.

In the depicted example, the fixed part 318 is equipped with a mounting slot 324 for mounting the power source 302, and a complementary mounting slot 326, having a profile corresponding to the mounting slot 324, is provided on the first detachable part 320. The power source 302 is confined to the mounting slot 324 by the complementary mounting slot 326 when the fixed part 318 and the first detachable part 320 are joined. To ensure effective heat dissipation of the power source 302, the mounting slot 324 is equipped with one or more support plates 328. The one or more support plates 328 are positioned at predetermined intervals within the mounting slot 324 to support the power source 302 in an elevated position, thereby enhancing the heat dissipation from the power source 302. Additionally, the fixed part 318 is provided with a set of rings 330 through which it is socketed to the power transmitting unit 314. The geometrical configuration and design aspects of the power transmitting unit 314 are discussed in further detail with reference to FIG. 4.

The power source 302 is configured to provide electric power to the drive member 306. In one configuration, the power source 302 provides an alternating current (AC) or a direct current (DC) power supply, as per the configuration of the drive member 306. In another configuration, the power source 302 may be a battery (e.g., a lithium-ion battery). Based on regulating the power supplied to the drive member 306, the rotational speed and therefore operating torque of the drive member 306 can be adjusted, which in turn adjusts the sexual intensity provided by the sexual stimulator 308. In a specific embodiment, the drive member 306 is a rotary motor (e.g., a stepper motor). The rotary motor, disposed within the body 202, features a compact design and functions to convert electrical energy into rotational movement of an output shaft 332 (shown in FIGS. 3C and 3D). The output shaft 332 may be cylindrical and is designed based at least on a torsional shear force, a bending moment, and a fatigue loading. Further, a casing of the drive member 306 is assembled tightly with the inner surfaces of the fixed part 318 and the first detachable part 320 through suitable fasteners.

Furthermore, one or more switches 334 are installed on the handle portion 208 of the body 202 for controlling operations of the device 200. The one or more switches 334 are electrically connected to the controller 304 which adjusts the operating parameters of the drive member 306 as per the user's desire for sexual stimulation. The one or more switches 334 may be operated manually by the user or automatically using a suitable communication device. The communication device, such as a smartphone, a notebook, a desktop computer, etc., can be communicably coupled to the controller 304. In an embodiment, a Wireless Fidelity (Wi-Fi) device may be used to connect the smartphone to the controller 304 to adjust the operating parameters of the device 200. In addition, a light emitting diode (LED) 336 may be provided on the handle portion 208 of the body 202 to notify the user about the power capacity of the power source 302.

The spiral structure 310 is operably coupled to the drive member 306 to facilitate its rotational movement. The spiral structure 310 is wrapped by the covering member 204. The rotational movement of the spiral structure 310 relative to the covering member 204 forms an undulation on at least a portion 338 thereof, thereby providing undulating stimulation to the erogenous zones (e.g., vagina) of the user's body. The spiral structure 310 includes a cylindrical shaft 340, a spiral thread 342 formed on an exterior surface 344 of the cylindrical shaft 340, and a friction-lessening member 346 disposed on the spiral thread 342 to form a higher pair with the covering member 204.

The cylindrical shaft 340 has a first end portion 348A and a second end portion 348B. The first end portion 348A is designed in a manner to be operably coupled to the drive member 306 using the power transmitting unit 314. The cylindrical shaft 340, which can be designed as either solid or hollow, is tailored to meet specific structural requirements. In one embodiment, the cylindrical shaft 340 may be constructed in various configurations such as a straight shaft, a taper shaft, or a step shaft, depending on the design needs. The selection of shaft type is critical and is determined by the operating parameters of the sexual stimulation. Herein, the cylindrical shaft 340 is designed to withstand both the static and dynamic stresses, generated during operation. These stresses arise from various forces acting on the cylindrical shaft 340, including torsional loads, bending moments, and axial forces.

The spiral thread 342 extends fully in a circumferential direction C of the cylindrical shaft 340 from the first end portion 348A to the second end portion 348B thereof. In a specific embodiment, the spiral thread 342 is configured as a protruded spiral profile extending fully in the circumferential direction C from the first end portion 348A to the second end portion 348B of the cylindrical shaft 340. In another embodiment, the spiral thread 342 may be configured as a grooved spiral profile extending fully in the circumferential direction C from the first end portion 348A to the second end portion 348B of the cylindrical shaft 340, without departing from the scope of the disclosure.

In the illustrated configuration, the spiral thread 342 has a first helicoid 350A, a second helicoid 350B, and a third helicoid 350C. The first helicoid 350A extends radially outward from the exterior surface 344 of the cylindrical shaft 340 up to a predetermined height. Substantially parallel to the first helicoid 350A, the second helicoid 350B, separated by a predetermined thickness, extends radially outward from the exterior surface 344 of the cylinder shaft 340 up to the predetermined height. The third helicoid 350C connects the first helicoid 350A and the second helicoid 350B across a width W, along a length L of the cylindrical shaft 340. The third helicoid 350C ensures structural integrity and continuity between the first helicoid 350A and the second helicoid 350B. Together, these helicoids form the thread profile that can be customized to various cross-sectional geometries (solid or hollow) such as square, rectangular, acme, or buttress profiles, depending on feasibility and design requirements.

Additionally, the configuration of the spiral thread 342 on the cylindrical shaft 340 can be engineered as a single-start or multi-start thread system (e.g., double-start, triple-start, etc.). Each configuration offers flexibility in defining a pitch P, which can be precisely adjusted within a predetermined range. The pitch P of the spiral thread satisfies an equation:

$$P/2=(L-W)/(n-1)$$

wherein n represents the total number of half-turns of the spiral thread 342.

This adaptability allows for tailoring the pitch P to meet specific user requirements, such as enhancing the density of the peristaltic effect. The precise control over the thread geometry and the pitch P ensures control over the vibration patterns, adjustable intensities, peristaltic and oscillating massage modes, and ripple-like oscillation of the sexual stimulator 308.

The friction-lessening member 346, disposed on the third helicoid 350C of the spiral thread 342, is engineered to significantly decrease the contact area between the friction-lessening member 346 and the covering member 204. In other words, the friction-lessening member 346 is engineered in a manner to form a higher pair with the covering member 204. This design minimizes the friction generated during the movement of the spiral structure 310 relative to the covering member 204, thereby substantially reducing the heat generated by the friction. Additionally, this design minimizes energy loss associated with overcoming sliding friction and the stickiness of mating surfaces. This not only enhances the service life of the spiral structure 310 and the covering member 204 but also the overall operating efficiency of the device 200.

In one example, when a denser peristaltic massage effect is desired, the pitch P of the spiral thread 342 can be reduced, allowing it to be wound around the cylindrical shaft 340 more times (i.e., more number of turns) and accommodating a greater length of the friction-lessening member 346. In another example, for a sparser peristaltic massage effect, the pitch P can be increased, reducing the number of revolutions around the cylindrical shaft 340 (i.e., less number of turns) and thus the length of the friction-lessening member 346. This adjustment results in a sparser peristaltic effect in the axial direction on the covering member 204 when the spiral structure 310 is rotated. The peristaltic effect is achieved through the rotation of the spiral structure 310, causing the friction-lessening member 346 on the covering member 204 to create a wave-like undulating motion.

The sexual stimulator 308 further includes a crankshaft 352 and the head structure 312. The crankshaft 352 is operably coupled to the second end portion 348B of the cylindrical shaft 340, while the head structure 312 is operably coupled to the crankshaft 352. The covering member 204, wrapped the spiral structure 310, also wrap the crankshaft 352, and the head structure 312. Consequently, the head structure 312 rotates with the rotation of the spiral structure 310. Herein, the head structure 312 adapted to provide vibrational stimulation to the erogenous zones of the user's body is a massage head.

In a specific embodiment, the head structure 312 is set at a predetermined angle with an axial direction of the cylindrical shaft 340. At the predetermined angle, the head structure 312 drives the swing of the covering member 204 when it rotates with the spiral structure 310, thereby realizing the swing massage of the massage part and improving the massage experience. The predetermined angle between the axial direction of the head structure 312 and the cylindrical shaft 340 may vary between 105° and 170°, such as 105°, 110°, 115°, 120°, 125°, 130°, 135°, 140°, 145°, 150°, 155°, 160°, 165°, or 170°, and the experience of the oscillating press massage of the head structure 312 under this angle range is better. In another embodiment, the head structure 312 can be used as a vibration motor, which can also realize the vibration massage in the swing process.

Furthermore, as shown in FIGS. 3C and 3D, the clitoral stimulator 206 is equipped with a vibration member 354. The vibration member 354 is housed by a sleeve 356. The vibration of the vibration member 354 is used to perform a vibration massage to relax the massage area to further enhance the sexual experience. The geometrical configuration and operating aspects of the clitoral stimulator 206 are well-known in the art, and therefore not extensively described here for the sake of bravity.

Figure 4:
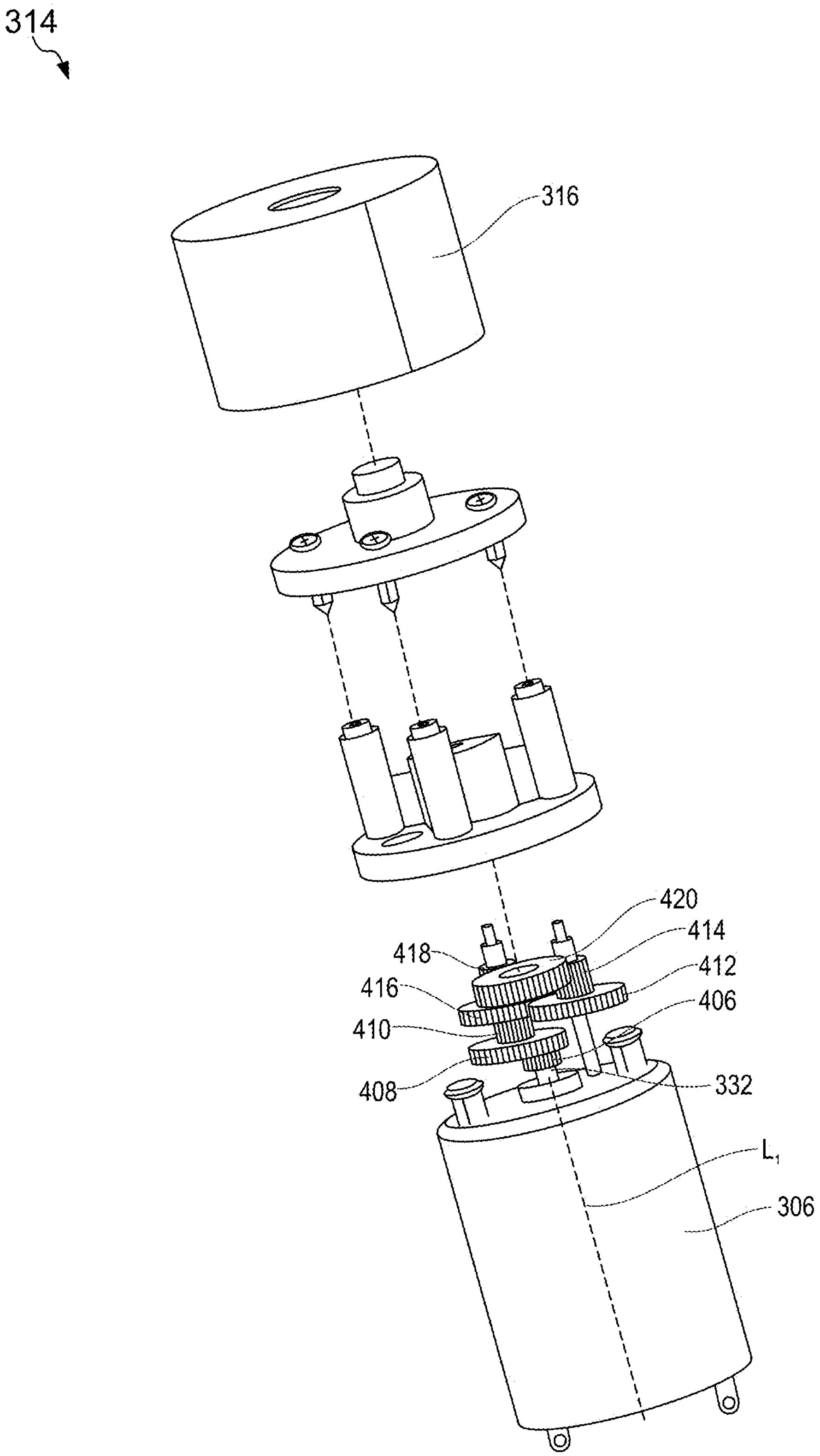
FIG. 4 illustrates an exploded view of a power transmitting unit of the sexual stimulation device, in accordance with an embodiment of the present disclosure.

FIG. 4 illustrates an exploded view of the power transmitting unit 314 of the sexual stimulation device 200, in accordance with an embodiment of the present disclosure. The power transmitting unit 314 is adapted to transmit power from the drive member 306 to the spiral structure 310. An axis of rotation $L_1$ of the drive member 306 (i.e., the rotary motor) is one of colinear and non-collinear with a longitudinal axis $L_2$ (shown in FIGS. 3C and 3D) of the spiral structure 310. The power transmitting unit 314 disclosed in the illustrated embodiment is configured as a compound gear drive, and the axis of rotation $L_1$ of the drive member 306 is colinear with the longitudinal axis $L_2$ of the spiral structure 310. The compound gear drive works by utilizing multiple gears of different sizes and configurations to transmit power and alter the rotational speed and torque between the drive member 306 and the spiral structure 310.

A first gear 406 is mounted on the output shaft 332 of the drive member 306. The first gear 406 meshes with a second gear 408. The second gear 408 rotates coaxially with a third gear 410. The third gear 410 meshes with a fourth gear 412, and the fourth gear 412 rotates coaxially with a fifth gear 414. The fifth gear 414 meshes with a sixth gear 416. The sixth gear 416 meshes with the second gear 408, whereas the third gear 410 and a seventh gear 418 rotate coaxially. The seventh gear 418 meshes with an eighth gear 420. The eighth gear 420 is connected to the cylindrical shaft 340, and the first gear 406 is driven to rotate by the drive member 306. Through the combined action of the first gear 406, the second gear 408, the third gear 410, the fourth gear 412, the fifth gear 414, the sixth gear 416, the seventh gear 418, and the eighth gear 420, the rotational speed ratio and the torque ratio between the output shaft 332 of the drive member 306 and the cylindrical shaft 340 of the spiral structure 310 can be changed, to realize the effect of reducing the rotational speed, increasing the torque, protecting the drive member 306, saving costs, and reducing the load inertia.

In other configurations, the output shaft 332 of the drive member 306 can be directly connected to the cylindrical shaft 340 of the spiral structure 310 using a coupling. The coupling can be a rigid coupling, which ensures precise torque transmission, or a flexible coupling, which accommodates misalignment and reduces vibration. Furthermore, other types of power transmission units can be employed, such as belt drives, chain drives, and similar mechanisms. These alternatives provide reliable and efficient power transfer from the output shaft 332 of the drive member 306 to the cylindrical shaft 340 of the spiral structure 310, without deviating from the scope of the disclosure.

Figure 5A:
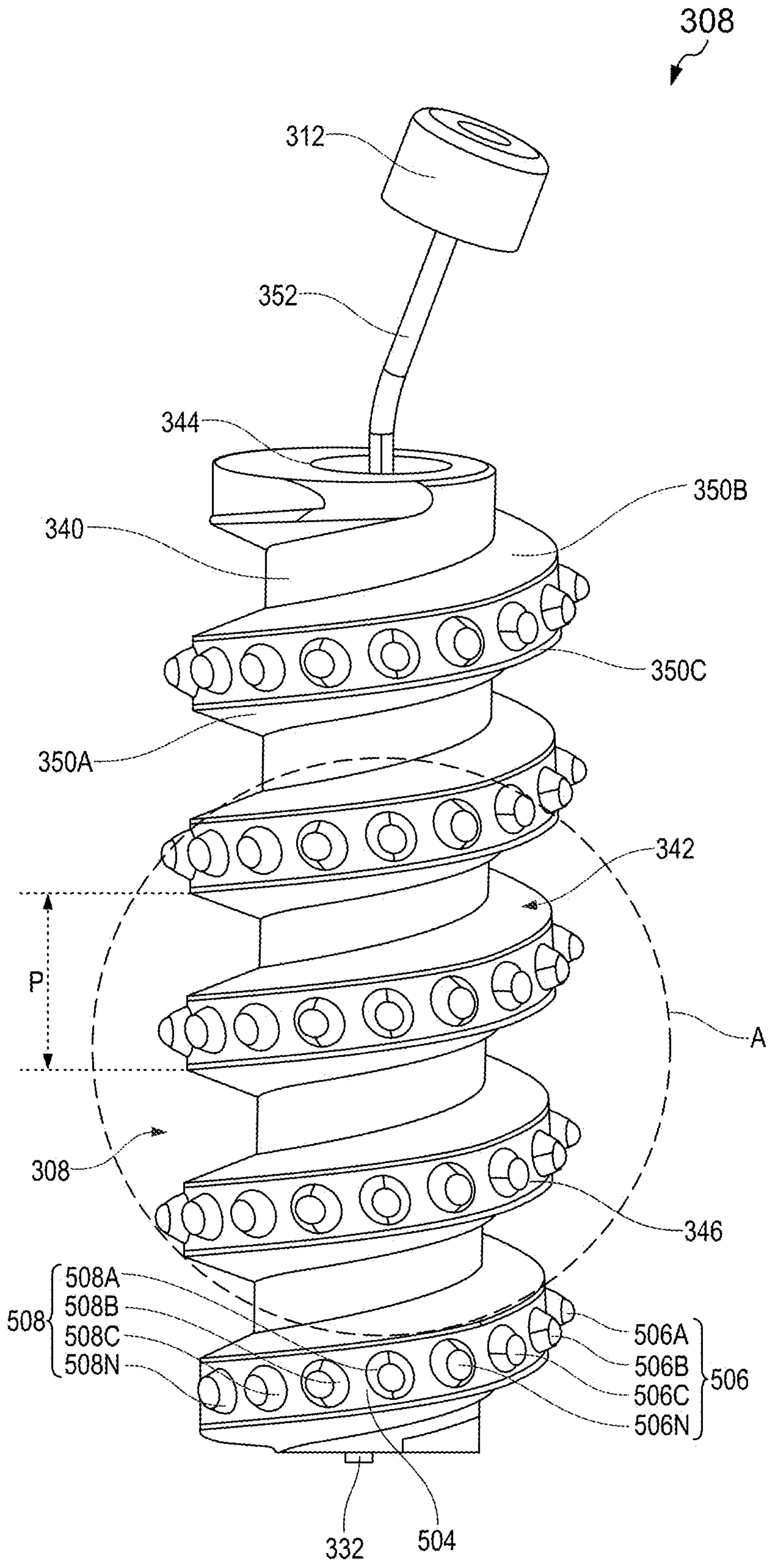
FIG. 5A illustrates a schematic representation of the sexual stimulator, in accordance with one embodiment of the present disclosure.
Figure 5B:
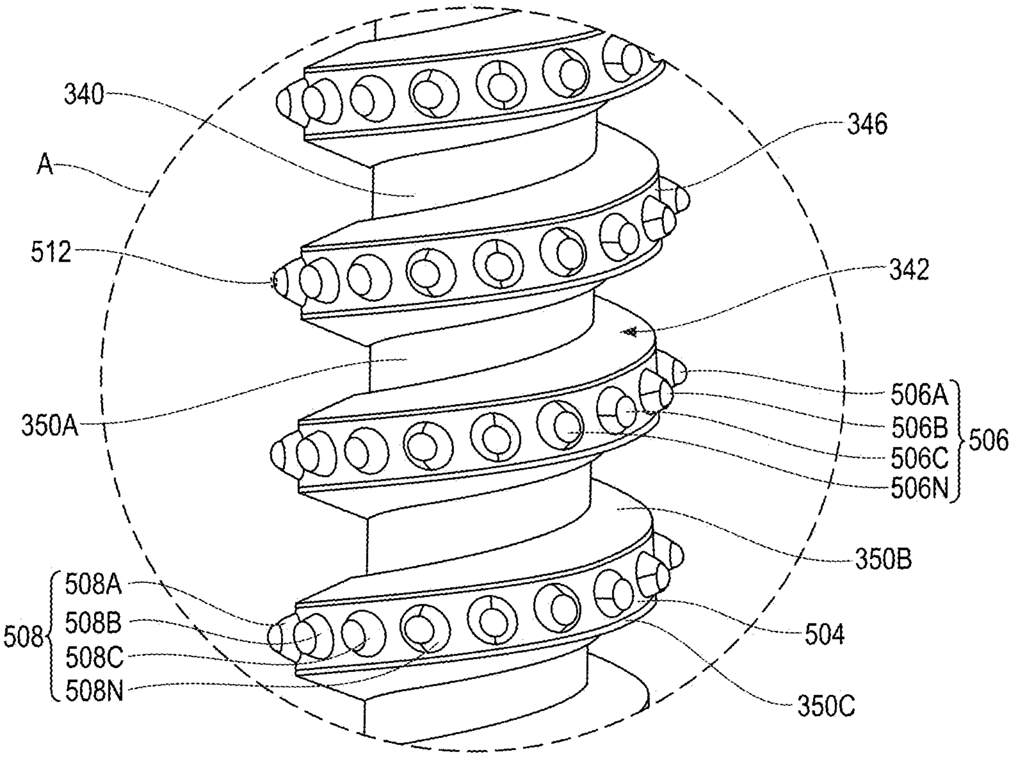
FIG. 5B illustrates an enlarged view of a portion 'A' of FIG. 5A.
Figure 5C:
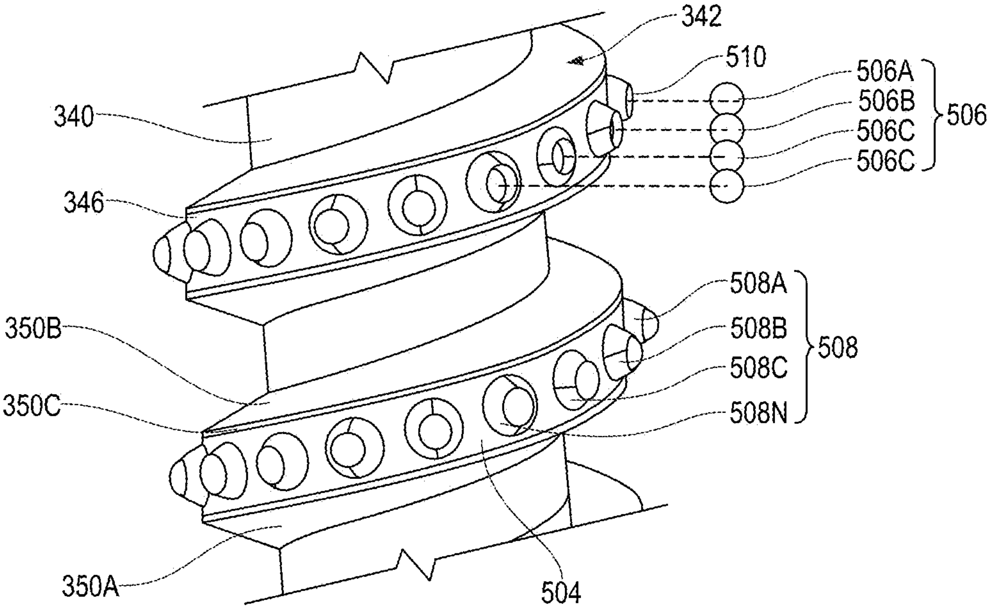
FIG. 5C illustrates an exploded view of at least a part of the sexual stimulator of FIG. 5B.

FIG. 5A illustrates a schematic representation of the sexual stimulator 308 of FIGS. 3A and 3B, in accordance with one embodiment of the present disclosure. FIG. 5B illustrates an enlarged view of a portion 'A' of FIG. 5A. FIG. 5C illustrates an exploded view of at least a part of the sexual stimulator 308 of FIG. 5B. In this embodiment, the friction-lessening member 346 includes a mounting strip 504 disposed on the third helicoid 350C, a plurality of rolling elements 506A, 506B, 506C, . . . , 506N (collectively referred to as "plurality of rolling elements 506") and a plurality of retainers 508A, 508B, 508C, . . . , 508N (collectively referred to as "plurality of retainers 508") mounted on the mounting strip 504 to retain the plurality of rolling elements 506. Each retainer 508A, 508B, 508C, . . . , 508N is provided with a through hole 510A, 510B, 510C, . . . , 510N on its top side to expose at a part of each rolling element 506A, 506B, 506C, . . . , 506N. When the covering member 204 is wrapped around the spiral structure 310, the plurality of rolling elements 506 press against the covering member 204. As a result, during a massage or undulating stimulation, at least a few rolling elements (e.g., 506A and 506B) press against the massage part or ergonomic zone of the user's body, it experiences a reaction force. Because the reaction force may constrain its rolling movement, the plurality of rolling elements 506 are arranged at a predetermined distance from one another on the surface of the third helicoid 350C.

In the illustrated configuration, the plurality of rolling element 506A, 506B, 506C, . . . , 506N rolls in the plurality of retainer 508A, 508B, 508C, . . . , 506N about its axis, relative to the covering member 204. This arrangement forms a higher pair at the contacting area of the plurality of rolling element 506A, 506B, 506C, . . . , 506N, and the covering member 204, whereas, due to flexibility, at least a portion of the covering member 204 contracts in a region between the first helicoid 350A and the adjacent second helicoid 350B. As a consequence, the rotational movement of the sexual stimulator 308 relative to the covering member 204 creates an undulation on at least a portion thereof. The undulation is a ripple-like oscillation in spiral propulsion, when squeezed by muscle via the spiral structure of the sexual stimulator 308, providing enhanced massage or sexual pleasure to the user. While creating this effect, the friction generated by the plurality of rolling elements 506 relative to the covering member 204 is a rolling friction, which is negligible, and almost no heat is generated due to friction. As a result, the service life of the covering member 204 and the friction-lessening member 346 improved.

In another configuration, the plurality of rolling element 506A, 506B, 506C, . . . , 506N can be fixedly positioned in the plurality of retainer 508A, 508B, 508C, . . . , 506N. In this regard, when the spiral structure 310 rotates, the plurality of rolling elements 506A, 506B, 506C, . . . , 506N form a sliding contact with the covering member 204. However, the sliding movement creates less frictional contact between them, whereas, due to flexibility, at least a portion of the covering member 204 contracts in a region between the first helicoid 350A and the adjacent second helicoid 350B. As a consequence, the rotational movement of the sexual stimulator 308 relative to the covering member 204 creates an undulation on at least a portion thereof. The undulation is a ripple-like oscillation in spiral propulsion, when squeezed by muscle via the spiral structure of the sexual stimulator 308, providing enhanced massage or sexual pleasure to the user. While creating this effect, the friction generated by the plurality of rolling elements 506 relative to the covering member 204 is a rolling friction, which is negligible, and almost no heat is generated due to friction. As a result, the service life of the covering member 204 and the friction-lessening member 346 improved.

In yet another configuration, as shown in FIGS. 3C and 3D, the need for the mounting strip 504 and the plurality of retainers 508 can be eliminated, and the plurality of rolling elements 506A, 506B, 506C, . . . , 506N may be directly fixedly attached to the third helicoid 350C. In each of these configurations, at least the portion 338 of the covering member 204 has wavy undulations, and the number of wave peaks 512 varies cyclically between X and X+1 bars from a line of sight (LOS) substantially vertical to the longitudinal axis $L_2$ of the spiral structure, wherein the n represents the total number of half-turns of the spiral thread 342.

By mounting the plurality of retainers 508 on the mounting strip 54 and the plurality of rolling elements 506 within the plurality of retainers 508, their modularization can be achieved. This modularization facilitates assembly by allowing individual components to be pre-assembled before being installed. The mounting strip 504 is designed to be removably attachable to the third helicoid 350C of the spiral thread 342. This design choice not only simplifies the initial assembly process but also significantly eases maintenance operations, enabling quick replacement of the modules formed by the plurality of retainers 508 and the plurality of rolling elements 506 without the need for disassembling the entire friction-lessening member 346. This approach improves overall reliability and reduces downtime, ensuring efficient operation and easy adaptability to different operational requirements or wear conditions. The precise alignment and secure attachment ensure that the plurality of rolling elements 506 function smoothly, maintaining optimal performance.

Figure 6:
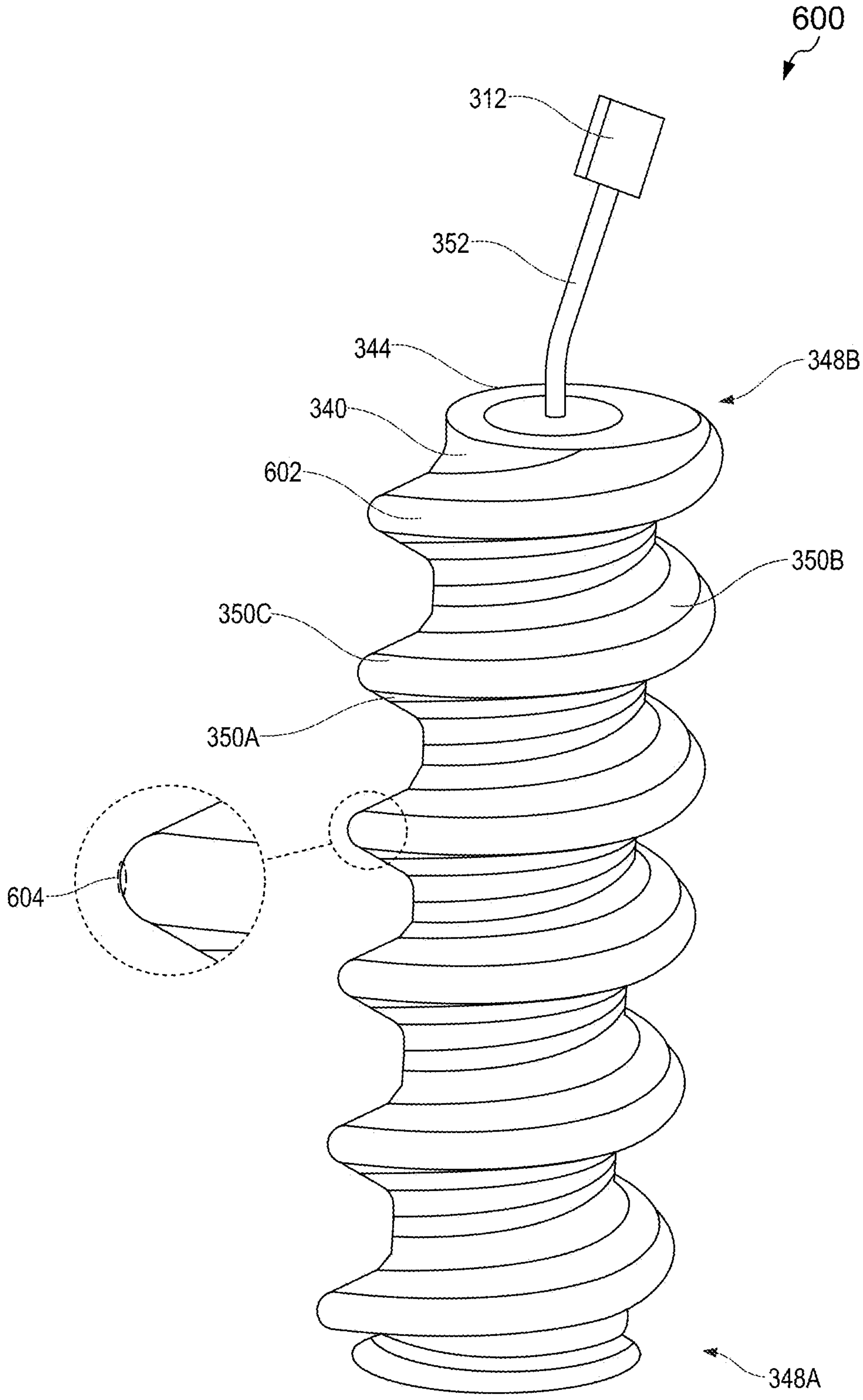
FIG. 6 illustrates a schematic representation of a sexual stimulator of the sexual stimulation device, in accordance with another embodiment of the present disclosure.

FIG. 6 illustrates a schematic representation of a sexual stimulator 600 of the sexual stimulation device 200, in accordance with another embodiment of the present disclosure. In this embodiment, the friction-lessening member 346 is configured as a curved surface 602. In one configuration, the curved surface 602 is an integral part of the spiral thread 342. In another configuration, the curved surface 602 may be an individual component fixed on the third helicoid 350C of the spiral thread 342. The cross-section of the curved surface 602 takes the form of one of a circular, a convex, oval, a fan, etc., cross-sections having an arcuate edge. In this regard, when the spiral structure 310 rotates, crest 604 of the curved surface 602 forms a sliding contact with the covering member 204. However, the sliding movement creates less frictional contact between them, whereas, due to flexibility, at least a portion of the covering member 204 contracts in a region between the first helicoid 350A and the adjacent second helicoid 350B. As a consequence, the rotational movement of the sexual stimulator 600 relative to the covering member 204 creates an undulation on at least a portion thereof. The undulation is a ripple-like oscillation in spiral propulsion, when squeezed by muscle via the spiral structure 310 of the sexual stimulator 600, providing enhanced massage or sexual pleasure to the user. While creating this effect, the friction generated by the curved surface 602 relative to the covering member 204 is a rolling friction, which is negligible, and almost no heat is generated due to friction. As a result, the service life of the covering member 204 and the friction-lessening member 346 improved.

It should be noted that, in this embodiment, except for the friction-lessening member 346, the geometrical configuration and operating aspects of the other components of the device 200 remain the same as that described in reference to FIGS. 3A-3C and 5A-5C. Therefore, the geometrical configuration and operating aspects of the other components of the device 200 are not reiterated here for the sake of brevity.

Figure 7:
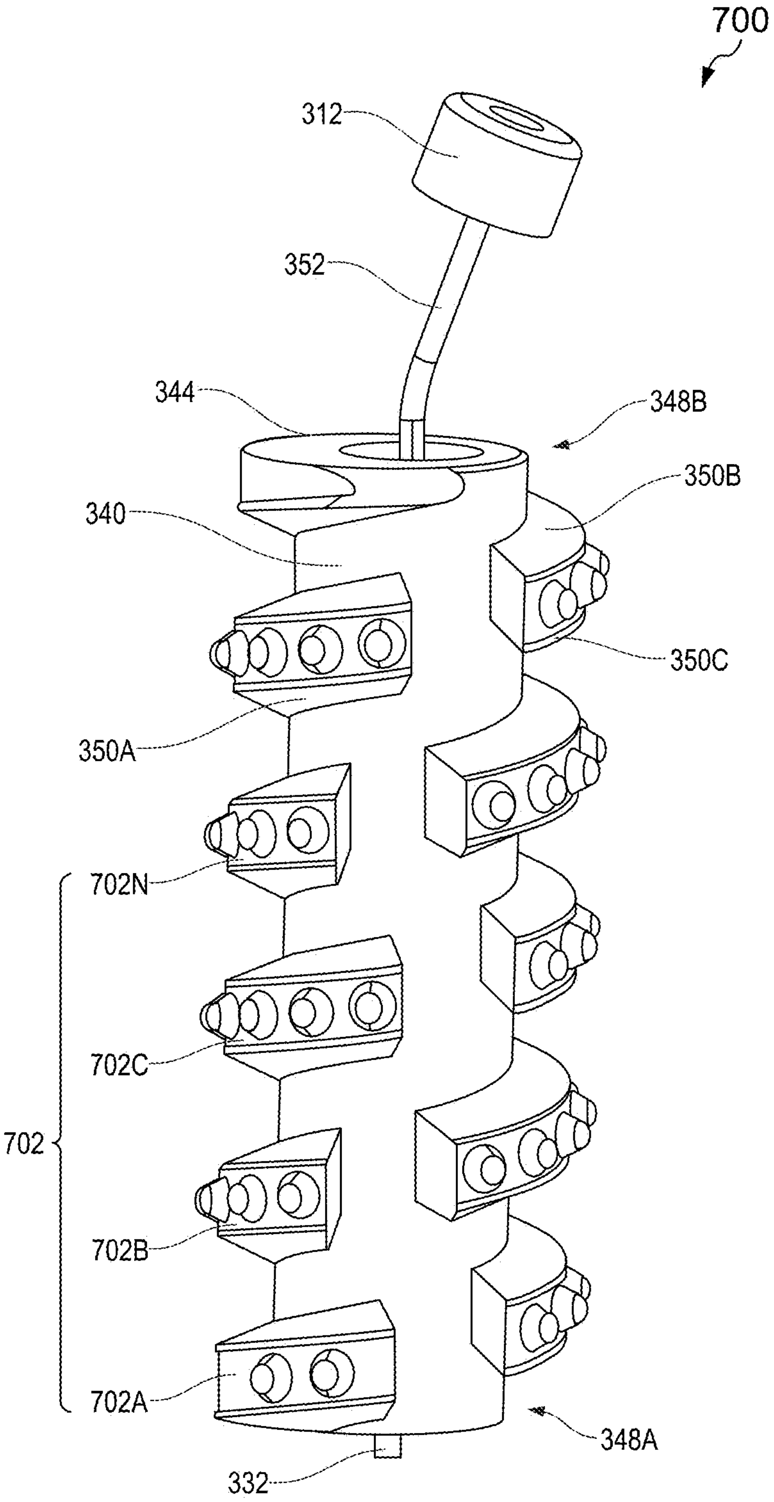
FIG. 7 illustrates a schematic representation of a sexual stimulator of the sexual stimulation device, in accordance with another embodiment of the present disclosure.

FIG. 7 illustrates a schematic representation of a sexual stimulator 700 of the sexual stimulator device 200, in accordance with another embodiment of the present disclosure. In this embodiment, instead of a single continuous spiral thread, one or more spiral threads 702A, 702B, 702C, . . . , 702N (collectively referred to as "one or more spiral threads 702") formed on the exterior surface 344 of the cylindrical shaft 340 from the first end portion 348A to the second end portion 348B. Each spiral thread 702A, 702B, 702C, . . . , 702N extends partially in the circumferential direction C of the cylindrical shaft 340. In a specific embodiment, the one or more spiral threads 702 are at least two. In the illustrated configuration, a sectoral angle of the one or more spiral threads 702A, 702B, 702C, . . . , 702N along the circumferential direction C of the cylindrical shaft 340 lies between 180° and 270°. As a consequence, the rotational movement of the sexual stimulator 308 relative to the covering member 204 creates a non-uniform undulation on at least a portion thereof. The non-undulation may vary the intensity of vibration patterns, adjustable intensities, peristaltic and oscillating massage modes, and ripple-like oscillation experience by the user. As a result, the user experiences sensational sexual pleasure.

It should be noted that, in this embodiment, except for the design of one or more spiral threads 702, the geometrical configuration and operating aspects of the other components of the device 200 remain the same as that described in reference to FIGS. 3A-3C and 5A-5C. Therefore, the geometrical configuration and operating aspects of the other components of the device 200 are not reiterated here for the sake of brevity.

Figure 8A:
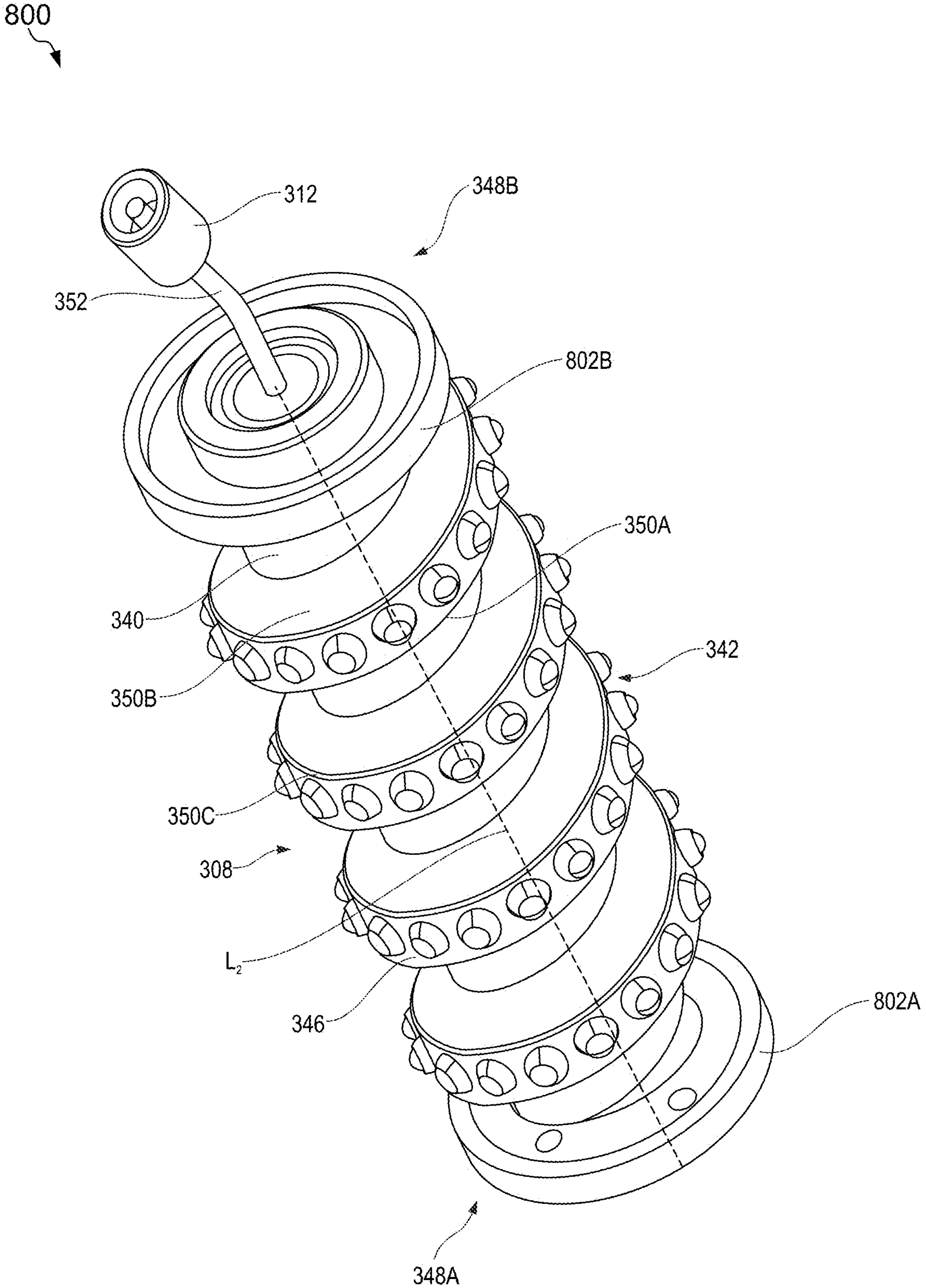
FIG. 8A illustrates a perspective view of a sexual stimulator of the sexual stimulation device, in accordance with yet another embodiment of the present disclosure.
Figure 8B:
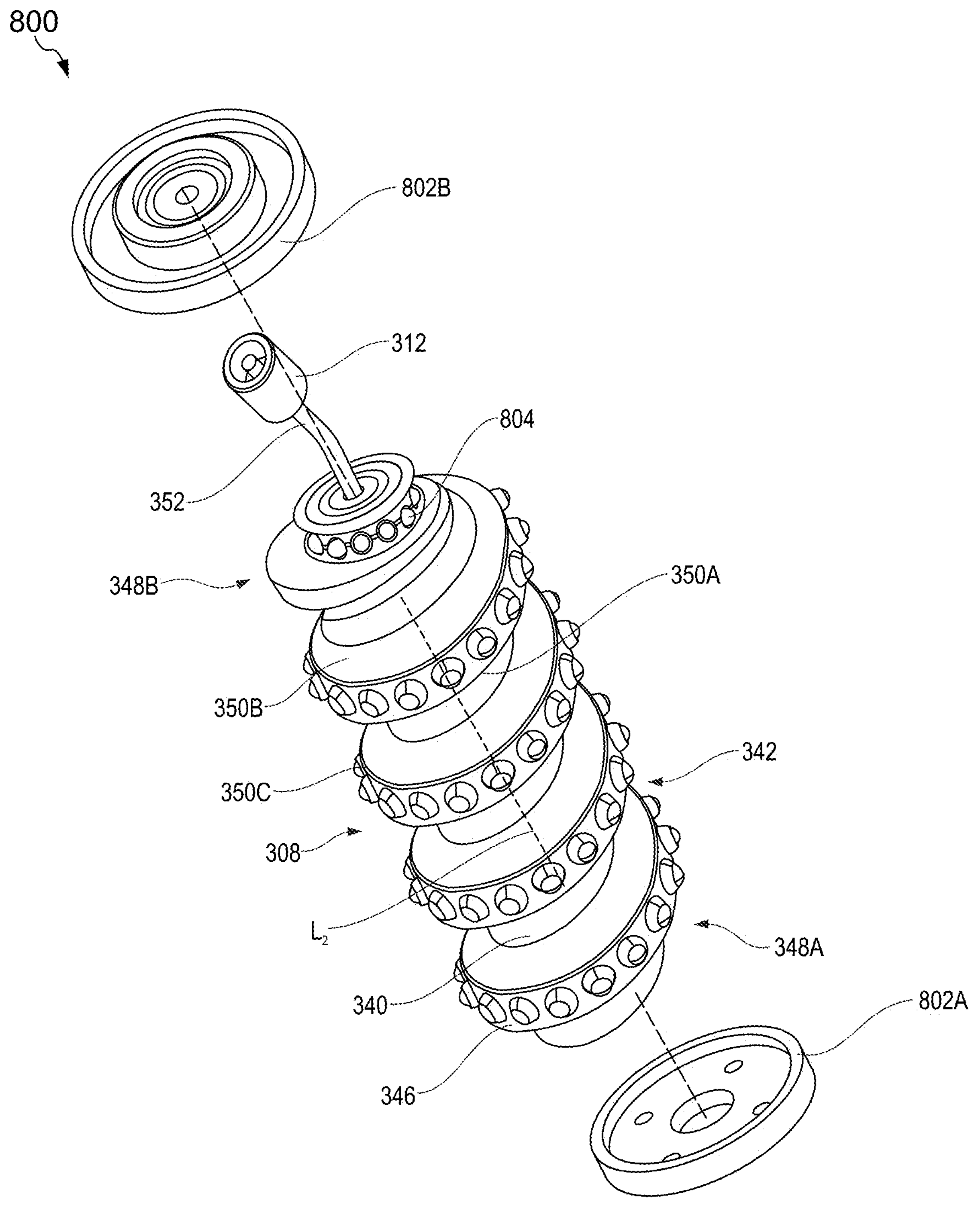
FIG. 8B illustrates an exploded view of the sexual stimulator depicted in FIG. 8A.

FIG. 8A illustrates a perspective view of a sexual stimulator 800 of the sexual stimulation device 200, in accordance with yet another embodiment of the present disclosure. FIG. 8B illustrates an exploded view of the sexual stimulator 800 depicted in FIG. 8A. The sexual stimulator 800 of the depicted embodiment is equipped with a first rotary member 802A and a second rotary member 802B. The first rotary member 802A is adapted to be rotatably mounted on the first end portion 348A and the second rotary member 802B is adapted to be rotatably mounted on the second end portion 348B of the cylindrical shaft 340. In a specific embodiment, the first rotary member 802A and the second rotary member 802B are mounted concentrically to the longitudinal axis $L_2$ of the spiral structure 310. In other words, the first rotary member 802A and the second rotary member 802B may rotate about the longitudinal axis $L_2$ of the spiral structure 310.

As shown in FIG. 8B, the first rotary member 802A is configured as a cylindrical disc that encircles the first end portion 348A of the cylindrical shaft 340 and is fastened to the power transmitting unit 314. This configuration allows for the relative rotational movement of the first end portion 348A of the cylindrical shaft 340 relative to the first rotary member 802A. In another configuration, instead of being fastened to the power transmitting unit 314, the first rotary member 802A can be rotatably mounted on the first end portion 348A of the cylindrical shaft 340 using a suitable bearing (e.g., roller bearing). Further, the second rotary member 802B is configured as a cylindrical disc, which is rotatably mounted on the second end portion 348B of the cylindrical shaft 340 using a bearing 804. As shown in FIG.

8B, a roller bearing is used to facilitate the relative rotational movement between the second rotary member 802A and the second end portion 348A of the cylindrical shaft 340. In another configuration, a suitable type of journal bearing could also be used in place of the roller bearing to achieve similar functionality.

In this regard, the covering member 204 is securely attached at both ends to the first rotary member 802A and the second rotary member 802B. Consequently, the spiral structure 310 rotates relative to the first rotary member 802A, the second rotary member 802B, and the covering member 204. As a result, the covering member 204 forms an undulation on at least the portion 338 thereof, thereby providing undulating stimulation to the erogenous zones (e.g., vagina) of the user's body. This design of the spiral structure 310 prevents any damage to the covering member 204 at its end portions. This design enhances the longevity and performance of the device 200 by reducing the wear and tear of the covering member 204. Additionally, the interaction between the spiral structure 310 and the covering member 204, the device 100 maintains consistent functionality and safety, contributing to a more reliable and effective user experience.

It should be noted that, in this embodiment, except for the mounting arrangement of the covering member 204 at its ends using the first rotary member 802A and the second rotary member 802B, the geometrical configuration and operating aspects of the other components of the device 200 remain the same as that described in reference to FIGS. 3A-3C and 5A-5C. Therefore, the geometrical configuration and operating aspects of the other components of the device 200 are not reiterated here for the sake of brevity.

Various embodiments of the disclosure, as discussed above, may be practiced with steps and/or operations in a different order, and/or with hardware elements in configurations, which are different from those which are disclosed. Therefore, although the disclosure has been described based upon these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A sexual stimulation device, comprising:

a body;

a drive member disposed within the body;

a sexual stimulator comprising a spiral structure adapted to be operably coupled to the drive member to allow a rotational movement thereof; and a covering member covering the spiral structure, wherein the spiral structure covered by the covering member is adapted to be inserted into an erogenous zone of a user's body, wherein the spiral structure comprises a spiral thread extending in a circumferential direction of the spiral structure, and a rolling member disposed on at least part of the spiral thread, wherein the rotational movement of the spiral structure relative to the covering member forms an undulation on at least a portion of the covering member without ripping the covering member, thereby providing undulating stimulation to the erogenous zone of the user's body, wherein the spiral structure further comprises:

a cylindrical shaft comprising a first end portion and a second end portion, wherein the spiral thread is provided on an exterior surface of the cylindrical shaft, wherein the spiral thread extends fully, in a circumferential direction of the cylindrical shaft, from the first end portion to the second end portion, and wherein the spiral thread comprises:

a first helicoid;

a second helicoid; and a third helicoid connecting the first helicoid and the second helicoid, wherein the rolling member is disposed on the third helicoid.

2. The sexual stimulation device as claimed in claim 1, wherein the sexual stimulator further comprises:

a crankshaft operably coupled to the second end portion; and a head structure operably coupled to the crankshaft and adapted to provide vibrational stimulation to the erogenous zone of the user's body, wherein the covering member covers the crankshaft and the head structure.

3. The sexual stimulation device as claimed in claim 2, wherein the head structure is positioned at a predetermined angle lying between 105° and 170° with respect to an axial direction of the cylindrical shaft.

4. The sexual stimulation device as claimed in claim 1, wherein at least a portion of the covering member contracts in a region between the first helicoid and the second helicoid.

5. The sexual stimulation device as claimed in claim 1, wherein a pitch of the spiral thread, a width of the third helicoid, a length of the cylindrical shaft, and a total number n of half-turns of the spiral thread satisfies an equation:

$$\text{pitch}/2 = (\text{length} - \text{width})/(n - 1).$$

6. The sexual stimulation device as claimed in claim 1, wherein at least the portion of the covering member has wavy undulations.

7. The sexual stimulation device as claimed in claim 1, wherein the drive member is a rotary motor, and wherein an axis of rotation of the rotary motor is one of colinear and non-collinear with a longitudinal axis of the spiral structure.

8. The sexual stimulation device as claimed in claim 1, wherein the covering member is made of a flexible material.

9. The sexual stimulation device as claimed in claim 1, further comprising:

a mounting strip disposed on the spiral thread, wherein a plurality of the rolling members are disposed on the third helicoid, and wherein a plurality of retainers are mounted on the mounting strip and retain the plurality of rolling elements.

10. The sexual stimulation device as claimed in claim 9, wherein each rolling element of the plurality of rolling elements is configured to roll relative to the covering member within a respective retainer of the plurality of retainers.

11. A sexual stimulation device, comprising:

a body;

a drive member disposed within the body;

a sexual stimulator comprising a spiral structure adapted to be operably coupled to the drive member to allow a rotational movement thereof, wherein the spiral structure comprises:

one or more spiral threads;

a mounting strip disposed on the one or more spiral threads;

a plurality of rolling elements adapted to form a rolling contact with the covering member without ripping the covering member; and a plurality of retainers mounted on the mounting strip and retaining the plurality of rolling elements; and a covering member covering the spiral structure, wherein the spiral structure covered by the covering member is adapted to be inserted into an erogenous zone of a user's body, and wherein the rotational movement of the spiral structure relative to the covering member forms an undulation on at least a portion of the covering member.

12. The sexual stimulation device as claimed in claim 11, wherein the covering member is made of a flexible material.

* * * * *